United States Patent
Bezanilla et al.

(10) Patent No.: US 12,552,611 B2
(45) Date of Patent: Feb. 17, 2026

(54) SOFT LANDING CONVEYOR SYSTEM

(71) Applicant: DISH Network L.L.C., Englewood, CO (US)

(72) Inventors: Juan Bezanilla, El Paso, TX (US); William L. Parent, Colorado Springs, CO (US)

(73) Assignee: DISH Network L.L.C., Englewood, CO (US)

( * ) Notice: Subject to any disclaimer, the term of this patent is extended or adjusted under 35 U.S.C. 154(b) by 118 days.

(21) Appl. No.: 18/401,189

(22) Filed: Dec. 29, 2023

(65) Prior Publication Data
US 2025/0214783 A1 Jul. 3, 2025

(51) Int. Cl.
*B65G 23/44* (2006.01)
*B65G 15/30* (2006.01)
*B65G 39/07* (2006.01)

(52) U.S. Cl.
CPC ............. *B65G 23/44* (2013.01); *B65G 15/30* (2013.01); *B65G 39/07* (2013.01); *B65G 2207/42* (2013.01)

(58) Field of Classification Search
CPC ........ B65G 23/44; B65G 15/30; B65G 39/07; B65G 2207/42
See application file for complete search history.

(56) References Cited

U.S. PATENT DOCUMENTS

| | | | | |
|---|---|---|---|---|
| 4,166,528 A * | 9/1979 | Renner | ................. | B65G 39/14 198/825 |
| 4,301,109 A * | 11/1981 | Kain | ....................... | B29C 39/10 264/277 |
| 11,319,160 B2 * | 5/2022 | Banasiak | ................ | B65G 39/12 |
| 11,661,284 B2 * | 5/2023 | Raaz | ...................... | B65G 15/08 198/835 |

FOREIGN PATENT DOCUMENTS

| | | | | |
|---|---|---|---|---|
| CN | 107777280 A | * | 3/2018 | ............. B65G 45/18 |
| CN | 112239047 A | * | 1/2021 | ............. B65G 23/44 |
| CN | 221369004 U | * | 7/2024 | |
| DE | 3802080 A1 | * | 7/1989 | ............. B65G 39/06 |
| GB | 2093786 A | * | 9/1982 | ........... B65G 39/125 |

OTHER PUBLICATIONS

IPSearch History Oct. 3, 2025 UTC; InnovationQ+; https://iq.ip.com/discover (Year: 2025).*

* cited by examiner

*Primary Examiner* — Gene O Crawford
*Assistant Examiner* — Abby A Jorgensen
(74) *Attorney, Agent, or Firm* — Perkins Coie LLP

(57) ABSTRACT

The present technology is generally directed to a conveyor system and a method of using thereof. In various embodiments, the conveyor system includes: a conveyor belt; a frame; a plurality of rollers supported by the frame and configured to support the conveyor belt, wherein each of the plurality of rollers has two end portions and a middle portion between the two end portions along a length direction of the roller, the roller is supported by the frame at the two end portions, and the middle portion has a smaller diameter than the two end portions; a drive system configured to move the conveyor belt; and a control system configured to control the drive system.

19 Claims, 8 Drawing Sheets

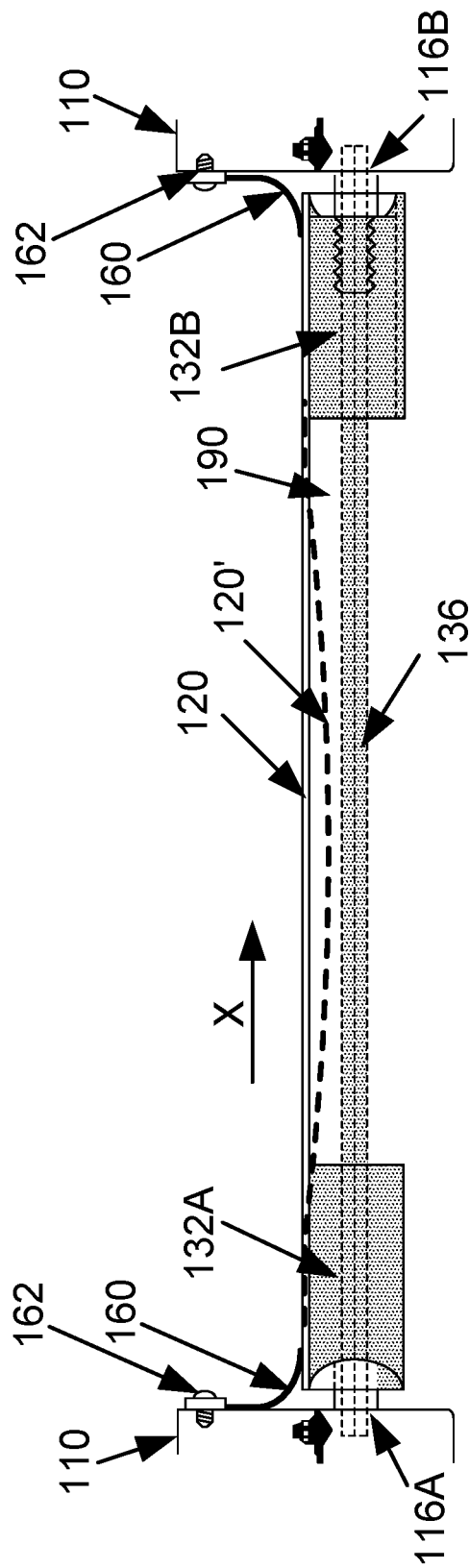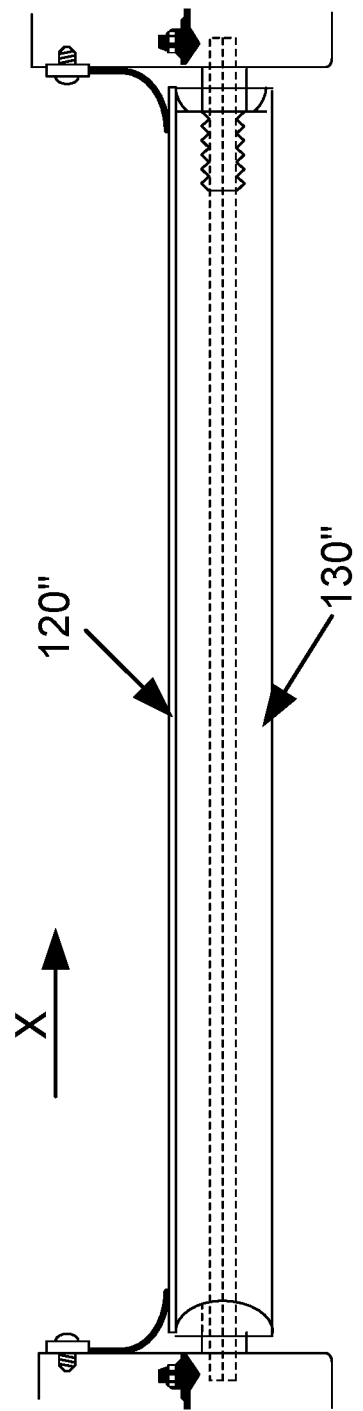
FIG. 2A
FIG. 2B

800

| Placing an item onto a conveyor belt of a conveyor system, in which: the conveyor belt is supported by a plurality of rollers of the conveyor system, and the conveyor system includes a cushion zone between the conveyor belt and the plurality of rollers formed by a varying dimension of each of the plurality of rollers along a length direction of the roller | 810 |

| Allowing the conveyor belt to deflect into the cushion zone to dissipate at least a portion of energy transferred to the conveyor belt by placing the item onto the conveyor belt | 820 |

*FIG. 8*

SOFT LANDING CONVEYOR SYSTEM

TECHNICAL FIELD

The present technology is directed to conveyor systems and methods.

BACKGROUND

Conveyor systems are widely used, enabling the efficient transportation of various types of goods, components, and materials. The systems are designed to move items from one location to another, often across a fixed path, facilitating the automation of processes in manufacturing, distribution, and warehousing.

SUMMARY

An aspect of the present disclosure relates to a conveyor system. The conveyor system may include a conveyor belt; a frame; a plurality of rollers supported by the frame and configured to support the conveyor belt, wherein each of the plurality of rollers has two end portions and a middle portion between the two end portions along a length direction of the roller, the roller is supported by the frame at the two end portions, and the middle portion has a smaller diameter than the two end portions; a drive system configured to move the conveyor belt; and a control system configured to control the drive system.

Another aspect of the present disclosure relates to a method of using a conveyor system. The method may include placing an item onto a conveyor belt of a conveyor system, in which: the conveyor belt is supported by a plurality of rollers of the conveyor system, and the conveyor system includes a cushioning zone between the conveyor belt and the plurality of rollers formed by a varying dimension of each of the plurality of rollers along a length direction of the roller; and allowing the conveyor belt to deflect into the cushioning zone to dissipate at least a portion of energy transferred to the conveyor belt by placing the item onto the conveyor belt.

BRIEF DESCRIPTION OF THE DRAWINGS

Many aspects of the present disclosure can be better understood with reference to the following drawings. The components in the drawings are not necessarily to scale. Instead, emphasis is placed on clearly illustrating the principles of the present disclosure.

FIGS. 2A-6B illustrate cross-sectional views of various rollers attached to a frame of a conveyor system in accordance with some embodiments of the present disclosure.

FIG. 8 is a flowchart of a process for using a conveyor system in accordance with some embodiments of the present disclosure.

DETAILED DESCRIPTION

Figure 1A:
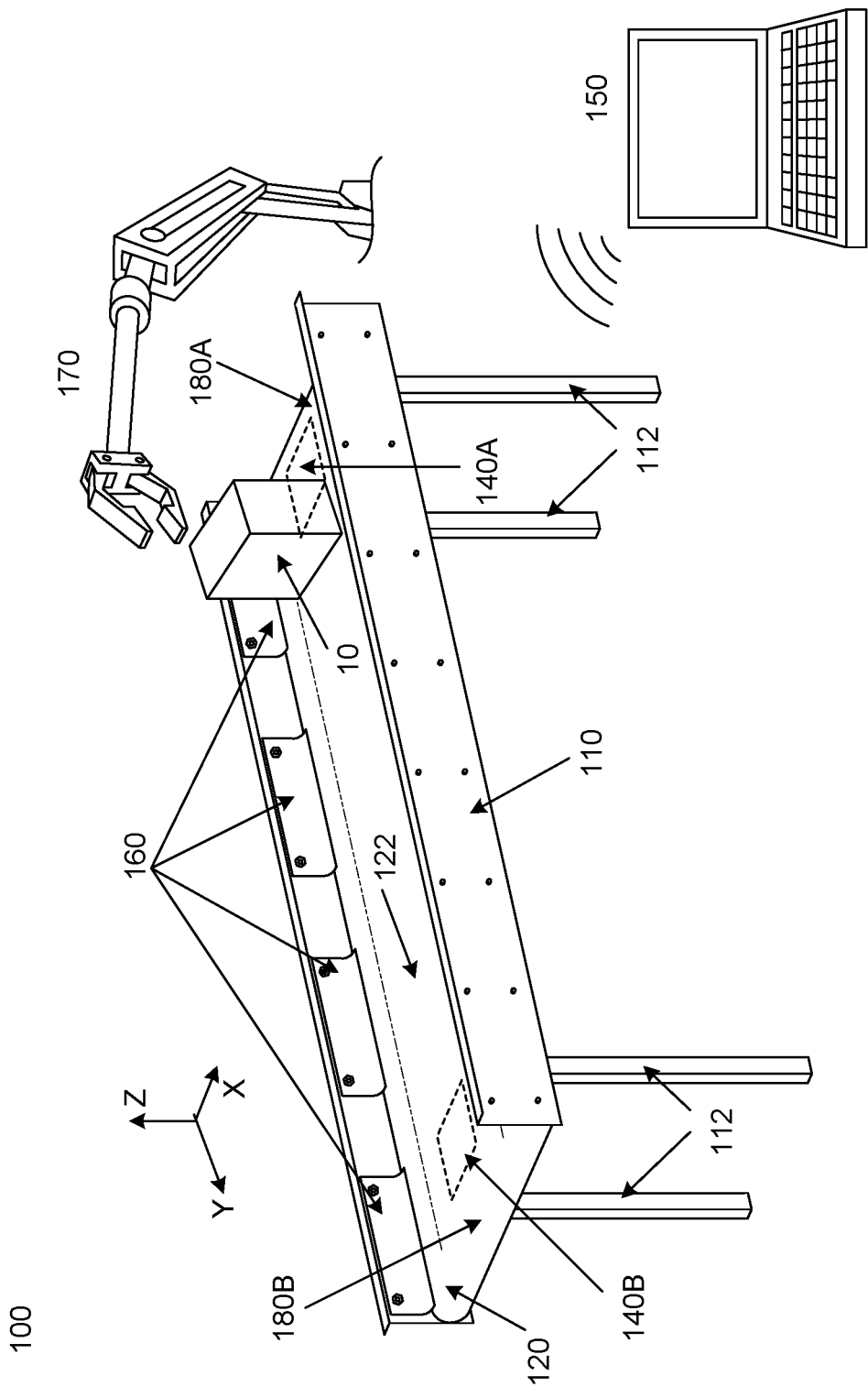
FIGS. 1A and 1B illustrate a perspective view and a top view of a conveyor system in accordance with some embodiments of the present document.

Aspects of the present disclosure relate to a conveyor system and method of using thereof. In some embodiments, the conveyor system may include a conveyor belt; a frame; a plurality of rollers supported by the frame and configured to support the conveyor belt, wherein each of the plurality of rollers has two end portions and a middle portion between the two end portions along a length direction of the roller, the roller is supported by the frame at the two end portions, and the middle portion has a smaller diameter than the two end portions; a drive system configured to move the conveyor belt; and a control system configured to control the drive system. The configuration of the rollers creates a cushioning zone between the conveyor belt and the rollers. When an item is placed on the conveyor belt, a force is exerted on the conveyor belt, momentum and energy (kinetic energy) are transferred to the conveyor belt, as well. The conveyor belt may deform and deflect into the cushioning zone under the force of the impact. This deformation involves stretching the material of the conveyor belt, thereby dissipating the item's kinetic energy and accordingly reducing the force transmitted back to the item and minimizing potential damage to the item. this conveyor system is designed for gentle handling of items with an innovative roller design that allows the conveyor belt to deform or deflect, creating a cushioning effect. The flexible or deformable conveyor belt and the roller design work in tandem to reduce impact forces on items dropped onto the conveyor belt for conveyance and improve the safe transportation of items. Accordingly, the conveyor system as disclosed herein may be referred to as a soft landing conveyor system.

Specific details of several embodiments of the present technology are described herein with reference to FIGS. 1A-7. The present technology, however, can be practiced without some of these specific details. In some instances, well-known structures and techniques often associated conveyor systems, and the like, have not been shown in detail so as not to obscure the present technology. The terminology used in the description presented below is intended to be interpreted in its broadest reasonable manner, even though it is being used in conjunction with a detailed description of certain specific embodiments of the disclosure. Certain terms can even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements can be arbitrarily enlarged to improve legibility. Component details can be abstracted in the Figures to exclude details such as position of components and certain precise connections between such components when such details are unnecessary for a complete understanding of how to make and use the present technology. Many of the details, dimensions, angles, and other features shown in the Figures are merely illustrative of particular embodiments of the disclosure. Accordingly, other embodiments can have other details, dimensions, angles, and features without departing from the spirit or scope of the present technology.

For illustrative purposes, a coordinate system is provided in FIGS. 1A-6A, in which an X-axis extends along a transverse axis or width direction of a conveyor belt (e.g., conveyor belt 120), a Y-axis is orthogonal to the X-axis and extends along a longitudinal axis or length direction of the conveyor belt (e.g., from a loading area to a discharge area of the conveyor system 100), and a Z-axis extends orthogonal to the X- and Y-axis along the direction of the gravity (e.g., pointing to the direction opposite to the direction of the gravity).

Figure 1B:
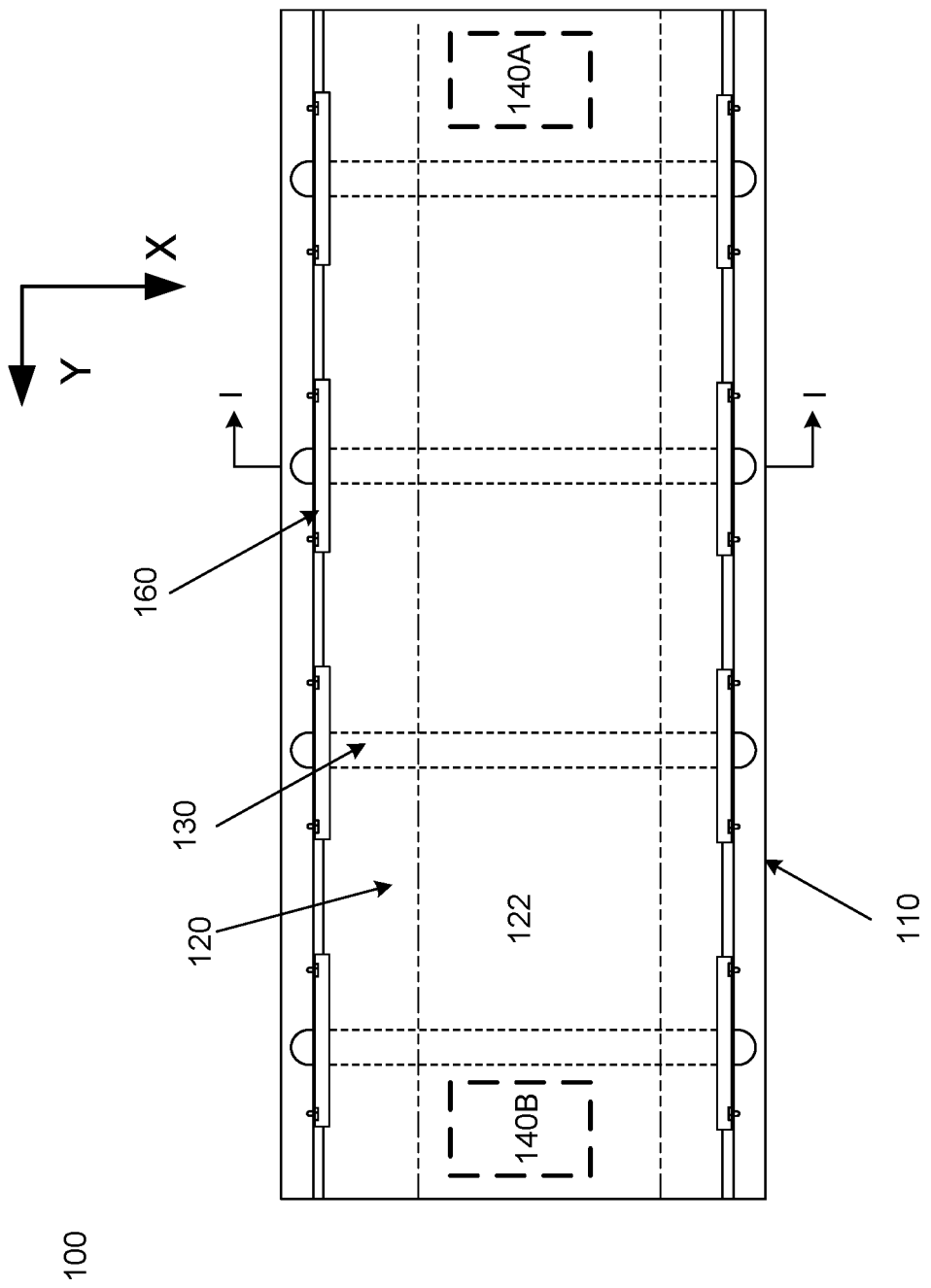

FIGS. 1A and 1B illustrate a perspective view and a top view of a conveyor system in accordance with some embodiments of the present disclosure. A conveyor system 100 may include a frame 110; a conveyor belt 120; a plurality of rollers 130 supported by the frame 110 and configured to support the conveyor belt 120, a drive system 140 (illustrated as 140A and 140B in FIGS. 1A and 1B) configured to move the conveyor belt; and a control system 150 configured to control the drive system 140. Components 160 may be mounted on the frame 110 and press the conveyor belt 120 against the rollers 130 to hold the conveyor belt 120 in place. An item 10 to be conveyed by the conveyor system 100 may be placed on the conveyor belt 120 manually or using a robotic arm 170, or transferred from another device (e.g., another conveyor system, another section of the conveyor system 100) by, e.g., gravity. The conveyor system 100 may receive the item 10 at a loading area 180A, and convey the item 10 along a defined path on the conveyor belt 120, and discharge the item 10 at a discharge area 180B. In some embodiments, the operation of the robotic arm 170 may be controlled by the control system 150.

The frame 110 may serve as the structural foundation that supports other components of the conveyor system 100, including the conveyor belt 120, the rollers 130, and the drive system 140. The frame may be made from materials that are strong, durable, and capable of withstanding the stresses and loads of operations of the conveyor system 100. For example, the frame may be made from at least one material include steel (e.g., carbon or stainless steel), aluminum, and heavy-duty plastic, or the like, or a combination thereof. The frame 110 may include a support structure, e.g., legs 112 as illustrated in FIG. 1A. One or more of the legs 112 may be height-adjustable for various purposes including, e.g., leveling or operating in conjunction with another device (e.g., a robotic arm, another conveyor system or another section of the conveyor system 100). The frame 110 may include mounting points for various components of the conveyor system 100, such as the rollers 130, components of the drive system 140, sensor brackets, etc.

The conveyor belt 120 may include a continuous loop of material looped over two or more pulleys under a tension and rotating over them. Merely by way of example, the conveyor belt 120 may be propelled by a drive pulley that is powered by a motor of the drive system 140. This movement of the conveyor belt 120 may enable the transportation of items 10 placed on the belt 120 from the loading area 180A to the discharge area 180B. The conveyor belt 120 may include a flexible material. Example materials include rubber, polyvinyl chloride (PVC), polyurethane, nylon, polyester, silicone, fiberglass, metal, an alloy thereof, etc., or a combination thereof. For example, the conveyor belt 120 may include steel cords sandwiched between a top layer and a bottom layer, in which the top layer may directly contact the items 10 and the bottom layer may be configured to protect the conveyor belt 120 from the wear and tear of its environment and/or the mechanical parts of the conveyor system 100. The conveyor belt 120 may be deformable such that the conveyor belt 120 may be sufficiently flexible to move into a cushioning zone formed between the respective middle portions of the rollers 130 and the conveyor belt 120 between while laying substantially flat against the adjacent end portions the rollers. For example, the conveyor belt 120 may deform by the impact force when an item 10 is placed on the conveyor belt 120.

Along the length direction (or referred to as the conveyance direction) of the conveyor belt 120, the conveyor belt 120 may be supported on multiple rollers 130 each of which may span the width of conveyor belt 120. The conveyor belt 120 may be pressed, by components 160, against the rollers 130 that are supported on the frame 110 as described elsewhere in the present document. The components 160 may also be attached to the frame 110. For example, a component 160 has the shape of L as illustrated in FIGS. 1A and 2A, with one side of the L being attached to the frame 110 and another side of the L pressing on the conveyor belt 120. The component 160 may be attached to the frame 110 by, e.g., screws 162, bolts, nuts, welding, riveting, glue, clamping, magnetic attachment, or the like, or a combination thereof. The illustration in FIG. 1B that one component 160 corresponds to one roller 130 is not intended to be limiting. For example, one component 160 may extend along the length direction of the conveyor belt 120 and correspond to two or more rollers 130. The conveyor belt 120 may include a central region 122 that substantially corresponds to and/or is located directly above the respective middle portions off the rollers 130.

A roller 130 may have two end portions 132 (individually illustrated as 132A and 132B in FIG. 2A) and a middle portion 136 between the two end portions 132 along a length direction X of the roller 130. FIG. 2A is a cross-sectional view from I-I of FIG. 1B. The roller 130 may be supported by the frame 110 at the two end portions 132. For example, the roller 130 may have an axis that can be inserted into holes or bores 116 (individually illustrated as 116A and 116B in FIG. 2A) on the frame 110, e.g., via bearings attached to the frame 110, and secured to prevent lateral movement using, e.g., retaining rings or collars placed on the axis outside the bearings.

A traditional roller, e.g., a roller 130", may have a uniform dimension along the length direction X of the roller 130" and be configured to support a conveyor belt 120", as illustrated in FIG. 2B. In contrast, the middle portion 136 of the roller 130 may have a smaller diameter than the two end portions 132 of the roller 130. As illustrated in FIG. 2A, the roller 130 may have a recess in the middle portion 136 with respect to the end portions 132. When unloaded, the conveyor belt 120 may directly contact the end portions 132, but be spaced apart from the middle portion 136 such that a cushioning zone 190 is formed between the conveyor belt 120 and the roller 130. Each respective middle portions may be spaced apart from a central region 122 of the conveyor belt 120 to define the cushioning zone 190 between the respective middle portions 136 and the central region 122; when an item is located on the central region 122 of the conveyor belt 120, the central region 122 may be configured to move downwardly toward the respective middle portions 136 (as illustrated by the deflected conveyor belt 120') to decrease the cushioning zone so as to cushion the item while the conveyor belt 120 maintains contact with the respective end portions 132 adjacent the respective middle portions 136.

Figure 3:
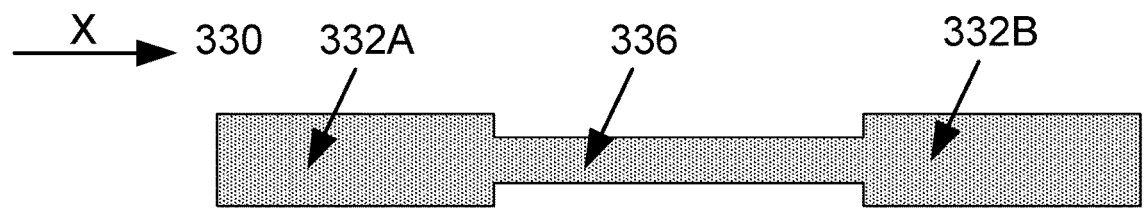

FIGS. 3-5B show various embodiments of the roller where a cushioning zone may exist between the conveyor belt 120 and the roller. The rollers 330, 430, and 530 as illustrated in FIGS. 3-5B are examples of the roller 130. The roller 330 as illustrated in FIG. 3 may have a circular cross-section viewed from the length direction X. The roller 330 has a stepped diameter profile as illustrated in FIG. 3. The middle portion 336 may be recessed with respect to the end portions 332 (individually illustrated as 332A and 332B); therefore, the middle portion 336 may have a smaller diameter than an end portion 332. When the conveyor belt 120 is supported on the roller 330, the conveyor belt 120 may directly contact the end portions 332 and be spaced from the middle portion 336, forming a cushioning zone (e.g., similar to the cushioning zone 190 as illustrated in FIG. 1B).

Figure 4:
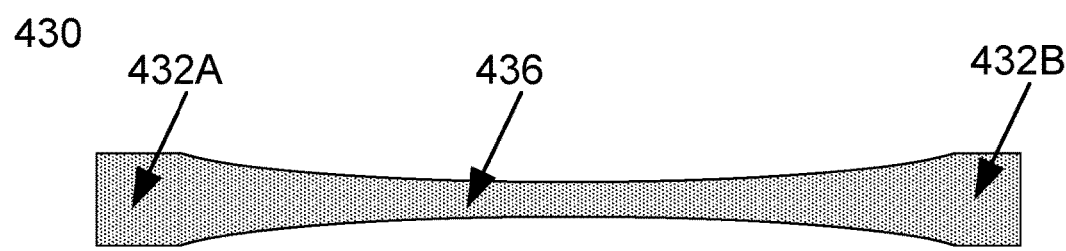

The roller 430 as illustrated in FIG. 4 may have a circular cross-section viewed from the length direction X. The diameter of the roller 430 may decrease gradually from an end portion 432 (individually illustrated as 432A and 432B) to the middle portion 436 of the roller 430. When the conveyor belt 120 is supported on the roller 430, the conveyor belt 120 may directly contact the end portions 432 and be spaced from the middle portion 436, forming a cushioning zone (e.g., similar to the cushioning zone 190 as illustrated in FIG. 1B).

Figure 5A:
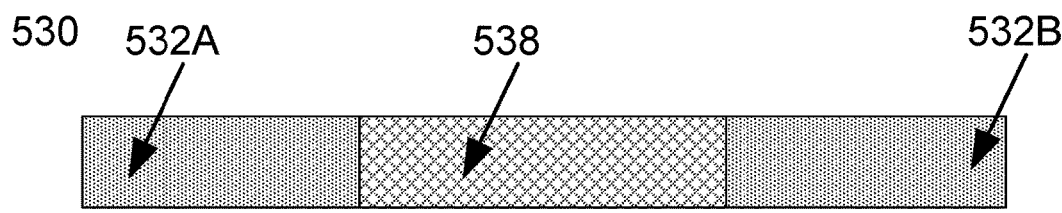
Figure 5B:
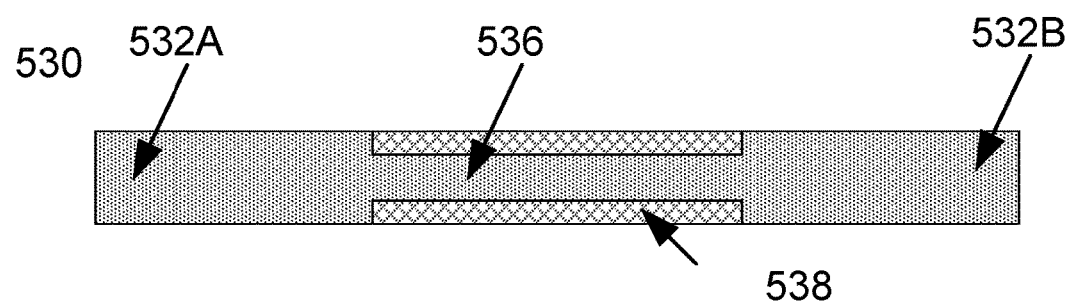

The roller 530 as illustrated in FIGS. 5A and 5B may have a circular cross-section viewed from the length direction X. The roller 530 may have a stepped diameter profile corresponding to a recess in the middle portion 536 relative to the end portions 532 (individually illustrated as 532A and 532B) as illustrated. When the conveyor belt 120 is supported on the roller 530, the conveyor belt 120 may directly contact the end portions 532 and be spaced from the middle portion 536, forming a cushioning zone (e.g., similar to the cushioning zone 190 as illustrated in FIG. 1B).

In some embodiments, the cushioning zone may be at least partially filled with a cushion. For example, the respective recesses may receive cushions. As illustrated in FIG. 5B, a cushion 538 may wrap around the middle portion 536 and be accommodated in the cushioning zone. The cushion 538 may include a material that is more deformable than the middle portion 536. For example, the cushion 538 may include foam, silicone, etc. The cushion may be more flexible than the middle portion 536 and/or the end portions 532 of the roller 530 such that the cushion 538 deforms to a larger extent than the middle portion 536 or the end portions 532 of the roller 530 when an item is placed on the conveyor belt 120 at a position directly above the roller 530.

Figure 6A:
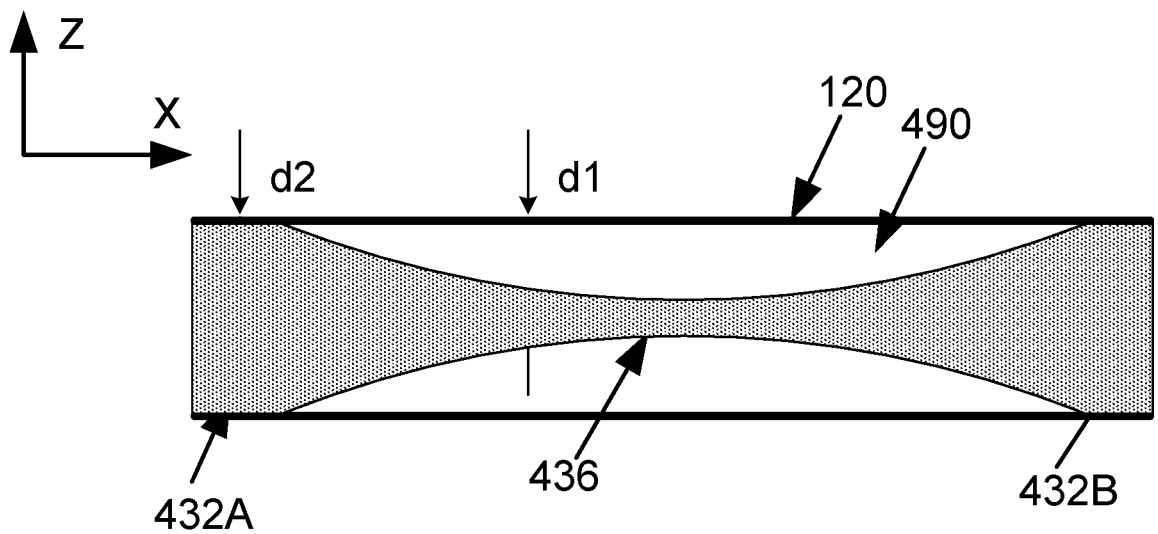

When the conveyor belt 120 is supported on the roller (e.g., roller 130 as illustrated in FIG. 2A, roller 330 as illustrated in FIG. 3, roller 430 as illustrated in FIG. 4, roller 530 as illustrated in FIGS. 5A and 5B) the conveyor belt 120 may directly contact the end portions and be spaced from the middle portion, forming a cushioning zone (e.g., similar to the cushioning zone 190 as illustrated in FIG. 1B). As illustrated in FIG. 6A with reference to the roller 430, the conveyor belt 120 may be spaced, along a direction Z that is substantially perpendicular to the length direction X of the roller, from a middle portion 436 of the roller 430 by a first distance d1 and from an end portion 432 of the roller 430 by a second distance d2. When the conveyor belt 120 is unloaded, the conveyor belt 120 may be substantially flat; the first distance d1 is larger than the second distance d2; there is a cushioning zone 490 between the conveyor belt 120 and the roller 430.

Figure 6B:
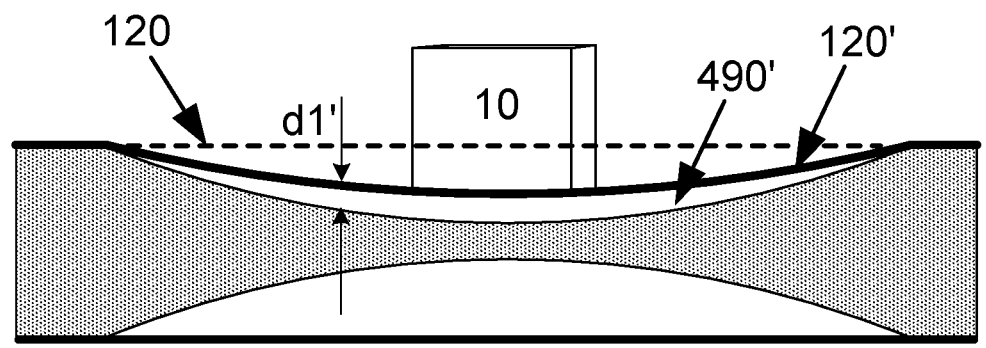

As illustrated in FIG. 6B, when an item 10 is placed onto the conveyor belt 120, the portion of the conveyor belt (the deformed configuration referred to as 120') where the item 10 is placed or in its vicinity may deform compared to its unloaded configuration as indicated by the dotted line 120, and deflect toward the roller 430 directly underneath the portion of the conveyor belt 120'. The cushioning zone 490' between the roller 430 directly underneath the portion of the conveyor belt 120' where the item 10 is placed or its vicinity decreases compared to the cushioning zone 490. The distance d1' between the roller 430 and the portion of the conveyor belt 120' where the item 10 is placed or its vicinity also decreases compared to d1.

Figure 7A:
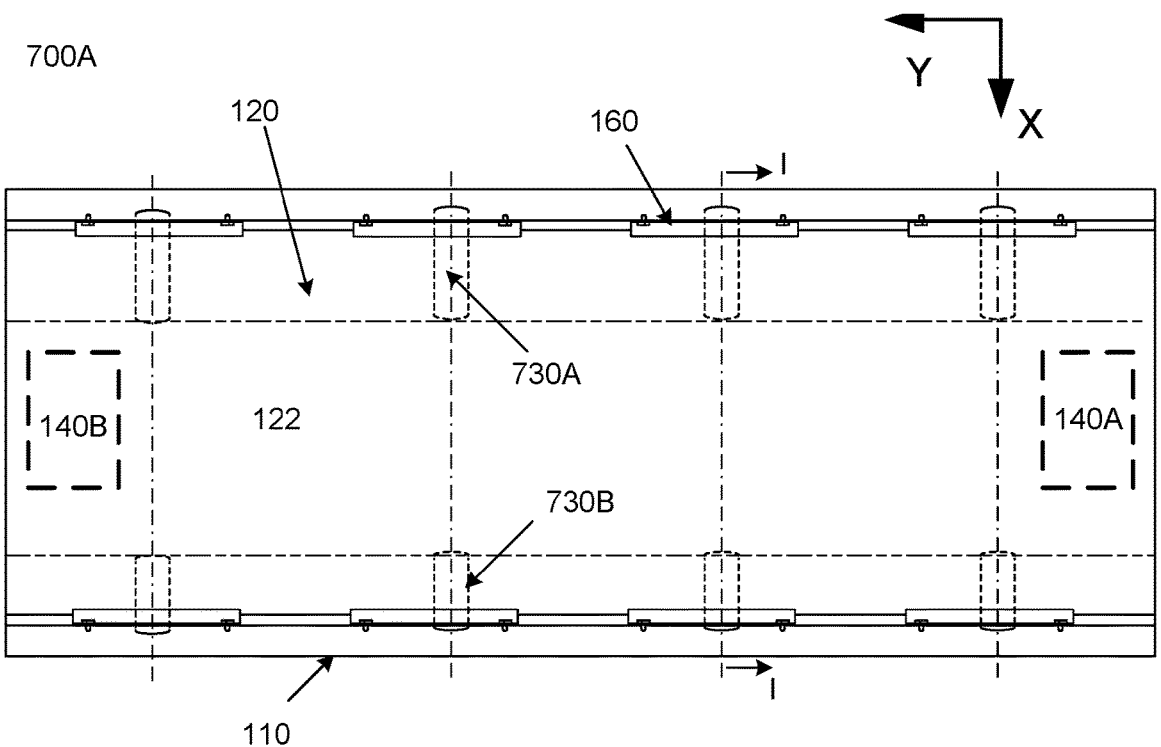
FIGS. 7A and 7B are top views of illustrative conveyor systems in accordance with some embodiments of the present disclosure.
Figure 7B:
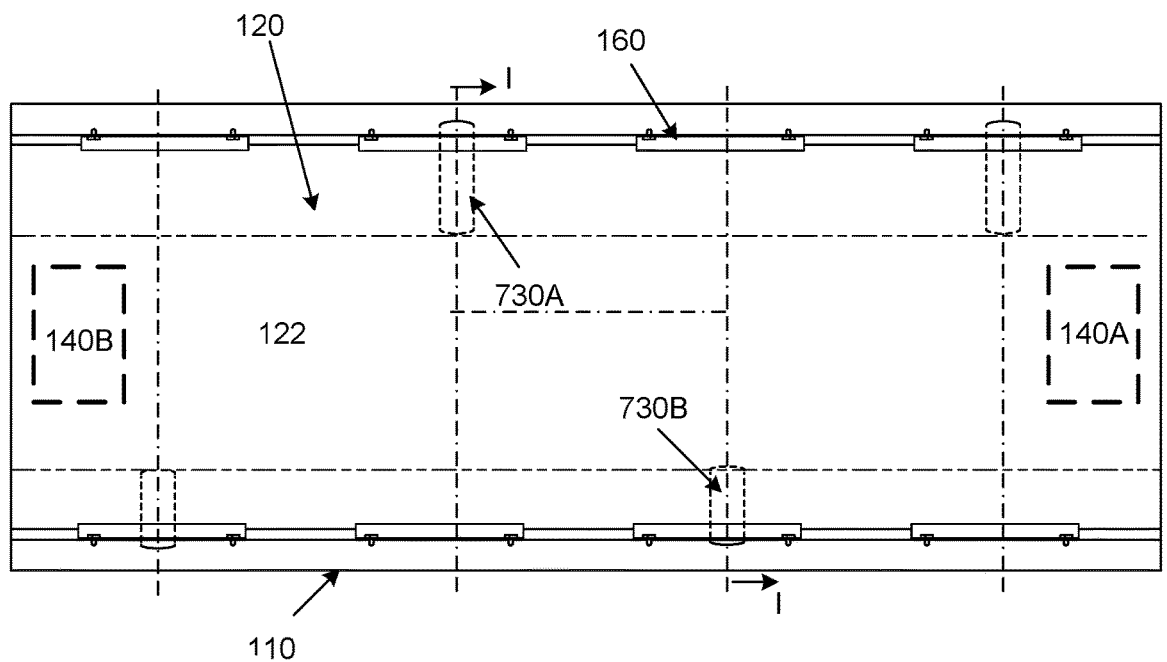
Figure 7C:
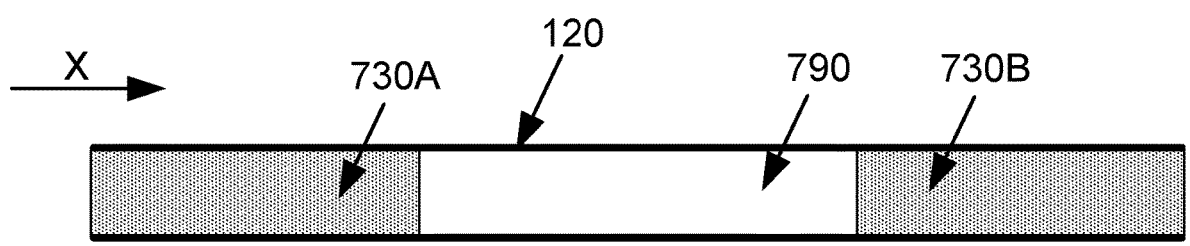
FIGS. 7C and 7D are cross-sectional views of rollers of conveyor systems illustrated in FIGS. 7A and 7B in accordance with some embodiments of the present disclosure.

FIGS. 7A and 7B illustrate top views of conveyor systems 700A and 700B in accordance with some embodiments of the present disclosure. FIG. 7C illustrates a cross-sectional view of rollers from I-I of FIGS. 7A and 7B, respectively. In some embodiments, the conveyor system 700 (individually identified as a first conveyor system 700A and a second conveyor system 700B) may include a plurality of rollers 730 (individually identified as 730A and 730B) whose lengths are shorter than the width of the conveyor belt 120. Accordingly, there are no rollers 730 directly underneath a central region 122 of the conveyor belt 120 so that a cushioning zone 790 may form underneath the central region 122 of the conveyor belt 120. A roller 730 may be supported on one side of the frame 110. For example, a roller 730 may have an axis that can be inserted into holes or bores 116 (individually illustrated as 116A and 116B in FIG. 2A) on the frame 110, e.g., via bearings attached to the frame 110, and secured to prevent lateral movement using, e.g., retaining rings or collars placed on the axis outside the bearings. A roller 730 may be similar to an end portion 132, 332, 432, and 532 as described elsewhere in the present document, which is not repeated here.

Figure 7D:
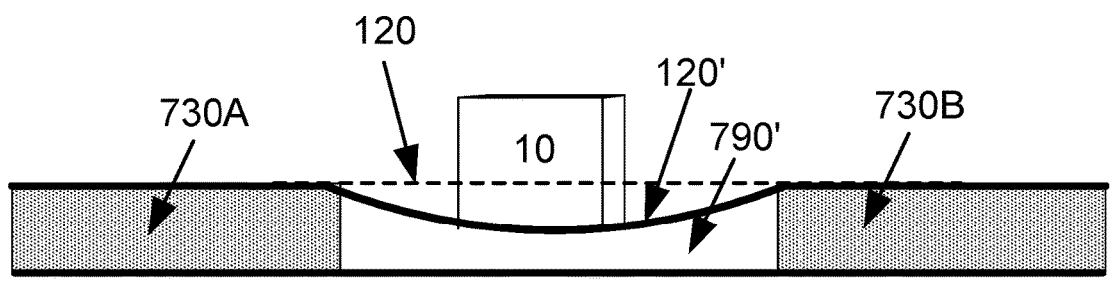

As illustrated in FIG. 7D, when an item 10 is placed onto the conveyor belt 120, the portion of the conveyor belt (the deformed configuration referred to as 120') where the item 10 is placed or in its vicinity may deform compared to its unloaded configuration as indicated by the dotted line 120, and deflect downward as illustrated by the curve 120'. The cushioning zone 790' underneath the portion of the conveyor belt 120' where the item 10 is placed or its vicinity decreases compared to the cushioning zone 790 when the conveyor belt 120 is unloaded.

When the item 10 is dropped, it is under the influence of at least gravity, accelerating towards the conveyor belt 120. Upon impact, a force is exerted on the conveyor belt 120 by the item 10, and an equal and opposite force is exerted on the item 10 by the conveyor belt 120, as per Newton's Third Law of Motion. The magnitude of this force may depend on one or more factors including, e.g., the mass of the item 10, the acceleration the item 10 experienced due to at least gravity, or the like, or a combination thereof. As the item 10 falls toward the conveyor belt 120, the item 10 gains momentum. At the moment of impact with the conveyor belt 120, this momentum may be transferred to the conveyor belt 120. The conveyor belt 120 may then absorb some of this momentum, reducing the item 10's velocity to zero if it stops on the conveyor belt 120. The item 10 has gravitational potential energy when held at a height, which is converted to kinetic energy as the item 10 falls. Upon impact, this kinetic energy may be transferred to the conveyor belt 120. The conveyor belt 120 may undergo elastic deformation in response to the applied force. The deformable nature of the conveyor belt 120 may allow it to absorb and dissipate some of this energy as, e.g., elastic potential energy (if the deformation is elastic). If the material is sufficiently elastic, it will stretch or compress at the point of impact, absorbing some of the item's kinetic energy. The cushioning zone 490 (or the cushion in the cushioning zone) due to the smaller diameter (than the end portions where the conveyor belt 120 contacts and is supported) of each of the rollers 430 directly underneath the portion of the conveyor belt where the impact occurs, or its vicinity, may provide room for the portion of the conveyor belt 120 to deform, thereby allowing energy dissipation, which in turn may reduce the impact on the item 10.

The impact may also create a transverse wave that propagates across the conveyor belt 120's surface along the width direction of the conveyor belt 120, which is substantially the same as the length direction X of the rollers 430. As the wave moves away from the point of impact, it may cause the conveyor belt 120 to move up and down, creating alternating areas of deflection. The movement of the conveyor belt 120 is constrained at the end regions along the width direction thereof by the components 160.

Returning to FIGS. 1A and 1B, a plurality of rollers 130 may be arranged substantially parallel to each other and spaced apart along a conveyance direction or the length direction of the conveyor belt 120 to define a cushioning zone (e.g., cushioning zone 190 as illustrated in FIG. 2A) extending along the conveyance direction and above the middle portions of the rollers 130, as illustrated as the direction along the Y-axis. For each of the plurality of rollers 130, the length direction of the roller 130 (the direction along the X-axis) may be substantially perpendicular to the conveyer direction. The conveyance belt 120 and/or the conveyance direction may be straight or curved.

In some embodiments, the conveyor system 100 may include a set of second rollers that individually have a substantially uniform diameter along a length direction of the individual second rollers (e.g., along the direction of the X-axis). The roller 130" as illustrated in FIG. 2B is an example of the individual second rollers. The individual second rollers, including their configuration and attachment to the frame 110, may be substantially the same as those described with respect to the roller 130 except for the substantially uniform diameter along the length direction of the individual second rollers.

In some embodiments, the set of second rollers are arranged along the conveyer direction (e.g., the direction of the Y-axis). In some embodiments, for at least a pair of second rollers 130" of the set, the pair of second rollers 130" may be spaced apart by a roller 130. For example, the plurality of rollers 130 and the set of second rollers 130" are arranged in alternating order. In some embodiments, the plurality of rollers 130 and the set of second rollers 130" may be arranged in periodic sections each of which include at least one roller 130 and at least one second roller 130". For example, a periodic section may include two roller 130 and one second roller 130" that is spaced between the two roller 130 of the section. In some embodiments, the plurality of rollers 130 may be arranged in a first portion of the frame 110 that encompasses the loading area. In some embodiments, the plurality of second rollers 130" may be arranged in a second portion of the frame 110 that encompasses the discharge area.

Returning to FIG. 1A, the drive system 140 may include a motor 140A configured to drive the movement of the conveyor belt 120 so that the conveyor belt 120 can carry items placed thereon from a first location to a different location. The drive system 140 may also include an actuator configured to adjust the tension in the conveyor belt 120. Because the tension relates to the performance of energy dissipation of the conveyor belt 120, the tension applied to the conveyor belt 120 may be adjusted based on the expected load. For example, when the conveyor system 100 needs to receive and convey heavy items, a high tension may be applied to the conveyor belt 120. As another example, when the conveyor system 100 needs to receive and convey fragile items, a low tension may be applied to the conveyor belt 120 to allow a longer impact period for energy dissipation. The tension of the conveyor belt 120 may be adjusted by the actuator 140B. The motor 140A and/or the actuator 140B may include an electric motor. The motor's size and power output are selected based on the requirements of the conveyor system, such as the weight of the items being transported and the speed at which they need to move. Motors can vary in type, including AC (Alternating Current) and DC (Direct Current) motors, and may also feature variable speed capabilities. The number (or count) and/or position of the motor 140A and/or the actuator 140B as shown in FIG. 1A are provided for illustration purposes and not intended to be limiting. For example, the conveyor system 100 may include more than one motor for driving the conveyor belt 120. As another example, the conveyor system 100 may include more than one actuator for adjusting the tension applied in the conveyor belt 120.

The drive system 140 may further include one or more components, such as a gearbox configured to reduce the motor's speed to a desired level for the conveyor belt 120. The gearbox may be used to increase the torque output from the motor, providing the needed force to move the conveyor belt loaded with items. Examples of gearboxes include, e.g., worm gear, helical gear, and planetary gear setups, each offering different characteristics in terms of efficiency, torque, and speed ratios.

The drive system 140 may include one or more pulleys, e.g., a drive pulley configured to be directly powered by the motor 140A and/or a gearbox for driving the conveyor belt 120. The drive pulley may transfer the rotational motion and torque from the motor 140A to the conveyor belt 120. The drive system 140 may include one or more idler pulleys that are not powered and configured to guide and support the conveyor belt 120. The idler pulleys may help in maintaining tension in the conveyor belt 120 and ensure smooth operation.

The drive system 140 may include one or more power transmission elements including, e.g., couplings, chains, sprockets, or belts used to transmit power from the motor 140A to the drive pulley.

The control system 150 may be configured to control the operation of the conveyor system 100 (e.g., the drive system 140 of the conveyor system 100). The control system 150 may include on/off switches, a speed controller, a tension controller, or the like, or a combination thereof. Merely by way of example, the control system 150 may be configured to manage the drive system 140 (e.g., one or more motors 140 that are configured to drive the conveyor belt 120). By adjusting the speed and torque of these motors, it can ensure that the conveyor system 100 operates at optimal efficiency for different loads and conditions. The control system 150 may be configured to adjust the tension of the conveyor belt 120. This may be done through the control of the actuator 140B. For example, the control system 150 can increase the tension by adjusting the actuator 140B when heavy items are detected on the conveyor belt 120. Higher tension may allow the conveyor belt 120 to absorb more impact, reducing the risk of damage to heavy items. As another example, for lighter items, the control system 150 can reduce the tension by adjusting the actuator 140B, ensuring energy-efficient operation and preventing excessive wear on the conveyor belt 120 and rollers 130.

To effectively adjust the tension and motor operation, the control system 150 may communicate with a series of sensors. These sensors can detect various parameters such as the weight of items to be dropped on the conveyor belt 120, the convey belt 120's speed, the current tension level, or the like, or a combination thereof. This data may be fed back to the control system 150, which uses it to make real-time adjustments to the motor speed and belt tension. The control system 150 may also perform failure or defect detection to detect issues with various components of the conveyor system 100, e.g., the status of the rollers 130, the condition of the conveyor belt 120, the temperature of the motor 140A or the actuator 140B, or the like, or a combination thereof.

The control system 150 may include memory and one or more processors. Memory can store instructions for running one or more applications or modules on the one or more processors. For example, the memory may be used in one or more embodiments to house all or some of the instructions needed to implement the functionality of sensor data retrieval, communications with other components of the conveyor system 100 (e.g., the drive system 140, sensors configured to monitor operation related information, control command generation, etc.); processor(s) may be used to execute the instructions to implement the implement the functionality of sensor data retrieval, communications, control command generation, etc.

In some embodiments, the memory of the control system 150 can include any device, mechanism, or populated data structure used for storing information. In accordance with some embodiments of the present disclosures, memory can encompass, but is not limited to, any type of volatile memory, nonvolatile memory, and dynamic memory. For example, the memory can be random access memory, memory storage devices, optical memory devices, magnetic media, floppy disks, magnetic tapes, hard drives, SIMMs, SDRAM, RDRAM, DDR, RAM, SODIMMs, EPROMS, EEPROMs, compact discs, DVDs, and/or the like. In accordance with some embodiments, memory may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory. In some example aspects, memory may store at least one database containing the customizable features of the networks, a prioritized order of the networks, or user requested content information, such as audio or video data.

The processor(s) of the control system 150 may include one or more programmable processors executing one or more computer programs to perform functions by operating on input data and generating output. The processor(s) may also be implemented as, special purpose logic circuitry, e.g., an FPGA (field programmable gate array) or an ASIC (application specific integrated circuit). The processor(s) may include both general and special purpose microprocessors, and any one or more processors of any kind of digital computer. Merely by way of example, the control system 150 may include a programmable logic controller (PLC) or a similar programmable controller. This unit may process input data from the sensors and execute predefined control algorithms to adjust the conveyor operation. The PLC may allow for precise control over the conveyor system 100, ensuring that it responds appropriately to varying operation conditions including, e.g., load conditions.

The control system 150 may communicate with one or more components of the conveyor system 100 via a wired or a wireless communication path. Examples of such communication paths may include the Internet, a mobile phone network, a mobile voice or data network (e.g., a 5G or Long Term Evolution (LTE) network), a cable network, a public switched telephone network, a short-range wireless communication network (e.g., Bluetooth or Near Field Communications (NFC)), or other types of communications networks or combinations of communications networks. The communication paths may separately or together include one or more communications paths, such as a satellite path, a fiber-optic path, a cable path, a path that supports Internet communications (e.g., Internet Protocol television (IPTV)), free-space connections (e.g., for broadcast or other wireless signals), or any other suitable wired or wireless communications path or combination of such paths. The control system 150 may include additional communication paths linking a plurality of hardware, software, and/or firmware components operating together. For example, the control system 150 may be implemented by a cloud of computing platforms operating together as the control system 150.

As another example, the control system 150 may be connected to or integrated with, via one or more such communication paths, a network of sensors, or broader warehouse or factory management software, allowing for automated operation based on the overall workflow. This integration can optimize the use of the conveyor system 100 as part of a larger logistical operation.

The control system 150 may incorporate one or more safety mechanisms including, e.g., emergency stop buttons, overload alerts, and automatic shutdown protocols in case of malfunctions or excessive strain on the conveyor system 100.

The conveyor system 100 may include or communicate with multiple sensors to achieve efficient, safe, and effective functioning. Example sensors include a speed sensor configured to measure the speed of the conveyor belt 120, a load sensors configured to determine the weight of items 10 on the conveyor belt 120, a proximity sensor configured to detect the presence or absence of items 10 on the conveyor belt 120 or other object in close proximity of the conveyor system 100 (e.g., the drive system 140), a tension sensor configured to measure the tension in the conveyor belt 120, a motor torque sensor configured to measure the torque output of the motor(s) of the drive system 140, a temperature sensor configured to monitor the temperature of one or more components like motors and bearings of the conveyor system 100, a vibration sensor configured to detect unusual vibrations in the conveyor system 100, an optical sensor (e.g., a photoelectric sensor) configured for various purposes (e.g., counting items, detecting their position on the belt, or ensuring proper spacing between them), an emergency stop sensor (e.g., a button-based sensor) configured to allow for the immediate shutdown of the conveyor system in case of an emergency, a radio-frequency identification (RFID) sensor configured to track the items 10 moving on the conveyor belt 120 (e.g., providing data for inventory management and process control), an ultrasound sensor configured for non-contact detection of items 10 on the belt (e.g., in dirty or dusty environments where optical sensors may be impaired or otherwise unpractical or undesirable), a Hall effect sensor configured to detect the position of the conveyor belt 120 and its components (e.g., for ensuring accurate synchronization of mechanical movements), etc.

The conveyor system 100 may include a user interface (UI), e.g., with a control panel, where operators can monitor the status of the conveyor system 100, input operational parameters, and override automatic controls if needed. This interface may have a manual control over the system and for troubleshooting. The UI may serve as the bridge between a user and the technical processes of the conveyor system 100. The UI may include a graphical user interface (GUI).

For example, the UI may feature a dashboard that provides a comprehensive overview of the conveyor system 100's current status including, e.g., real-time data on motor speed, conveyor belt speed, and belt tension. The UI may have a dedicated section for controlling and adjusting the motor speed. This may be implemented through a slider or input field where the user can set a specific speed or choose from predefined speed settings optimized for different load types. The UI may include an interface element for monitoring and adjusting the speed of the conveyor belt 120. The UI may also display the recommended belt speed for various weights or types of items being transported. The UI may include a UI element configured to allow a user to manually adjust or set parameters for the tension of the conveyor belt 120 including, e.g., manual override options for situations where specific tension settings are needed. The UI may present data from various sensors, such as weight sensors, speed sensors, and tension sensors. This data may help the user understand the current operating conditions of the conveyor and make informed decisions. The UI may provide access to historical data and logs, detailing past operations, changes made, and any alerts or issues that have arisen. This may assist the user for troubleshooting and understanding the long-term performance of the conveyor system 100. The UI may feature an alert system, notifying users of any issues, such as malfunctions, excessive load, or deviations from optimal operating conditions. This ensures immediate attention to any potential problems. The UI may have an UI element for help and support, providing users with guidance on how to operate the conveyor system 100, troubleshoot issues, and understand the readings and controls. Users may be able to customize certain aspects of the UI, such as display settings, notification preferences, and control panel layouts, to suit their individual needs and preferences. The UI may include quick-access buttons for emergency stops and other safety protocols, ensuring that users can quickly respond to any hazardous situations. The conveyor system 100 may offer remote access capabilities, allowing users to monitor and control the conveyor system from different locations. Additionally, the UI may integrate with other systems in the facility for coordinated operations.

FIG. 8 is a flowchart of a process for using a conveyor system in accordance with some embodiments of the present disclosure. The process 800 may include at 810 placing an item onto a conveyor belt of a conveyor system. The conveyor belt may be supported by a plurality of rollers of the conveyor system (e.g., the conveyor system 100), and the conveyor system may have a cushioning zone between the conveyor belt and the plurality of rollers formed by a varying dimension of each of the plurality of rollers along a length direction of the roller. The process 800 may include at 820 allowing the conveyor belt to deflect into the cushioning zone to dissipate at least a portion of energy transferred to the conveyor belt by placing the item onto the conveyor belt. The process 800 may include conveying the item on the conveyor belt along a conveyance direction. The plurality of the rollers may be arranged substantially parallel to each other along the conveyance direction. The individual rollers may have two end portions and a middle portion that has a smaller diameter than the two end portions. The process 800 may further include adjusting a tension force applied to the conveyor belt based on a weight of the item. The process 800 may further include allowing the conveyor belt to restore from the deflection after the item is removed from the conveyor belt.

Some embodiments may implement one or more of the following solutions, listed in clause-format. The following clauses are supported and further described in the embodiments above and throughout this document.

1. A conveyor system, including: a conveyor belt; a frame; a plurality of rollers supported by the frame and configured to support the conveyor belt, wherein each of the plurality of rollers has two end portions and a middle portion between the two end portions along a length direction of the roller, the roller is supported by the frame at the two end portions, and the middle portion has a smaller diameter than the two end portions; a drive system configured to move the conveyor belt; and a control system configured to control the drive system.

2. The conveyor system of any one or more solutions disclosed herein, in which each respective middle portion is spaced apart from a central region of the conveyor belt to define a cushioning zone between the respective middle portion and the central region, wherein when an item is located on the central region, the central region is configured to move downwardly toward the respective middle portion to decrease the cushioning zone so as to cushion the item while the conveyor belt maintains contact with the two end portions adjacent the respective middle portion.

3. The conveyor system of any one or more solutions disclosed herein, in which for at least one of the plurality of rollers, the middle portion has a diameter that decreases gradually from an adjacent one of the end portions.

4. The conveyor system of any one or more solutions disclosed herein, in which the plurality of rollers includes at least one stepped diameter roller.

5. The conveyor system of any one or more solutions disclosed herein, in which the at least one stepped diameter roller has a recess in the middle portion of the roller relative to the end portions of the roller.

6. The conveyor system of any one or more solutions disclosed herein, in which the at least one stepped diameter roller has a cushion positioned in the recess, the cushion being more flexible than the middle portion and the end portions of the roller such that the cushion deforms to a larger extent when the middle portion or the end portions of the roller than an item is placed on the conveyor belt at a position directly above the roller.

7. The conveyor system of any one or more solutions disclosed herein, in which: for each of the plurality of rollers, the conveyor belt is spaced, along a direction substantially perpendicular to the length direction of the roller, from a middle portion of the roller by a first distance and from an end portion of the roller by a second distance, and when the conveyor belt is unloaded, the first distance is larger than the second distance.

8. The conveyor system of any one or more solutions disclosed herein, in which when the conveyor belt is unloaded, there is a cushioning zone between the conveyor belt and the middle portion of each of the plurality of rollers to allow the conveyor belt to deflect into.

9. The conveyor system of any one or more solutions disclosed herein, in which when an item is placed on the conveyor belt, at least a portion of the conveyor belt deflects toward one or more of the plurality of rollers that are positioned to support the at least a portion of the conveyor belt such that the cushioning zone corresponding to the one or more rollers decreases.

10. The conveyor system of any one or more solutions disclosed herein, in which the conveyor belt is configured to deflect such that at least a portion of energy transferred to the conveyor belt by placing an item on the conveyor belt dissipates by the deflection of the conveyor belt.

11. The conveyor system of any one or more solutions disclosed herein, in which the conveyor belt includes a flexible material.

12. The conveyor system of any one or more solutions disclosed herein, in which the conveyor belt includes rubber, polyvinyl chloride (PVC), polyurethane, nylon, polyester, silicone, or fiberglass.

13. The conveyor system of any one or more solutions disclosed herein, in which the conveyor belt is deformable.

14. The conveyor system of any one or more solutions disclosed herein, in which the plurality of rollers are arranged substantially parallel to each other along a conveyance direction.

15. The conveyor system of any one or more solutions disclosed herein, in which for each of the plurality of rollers, the length direction of the roller is substantially perpendicular to the conveyer direction.

16. The conveyor system of any one or more solutions disclosed herein, in which the drive system includes an actuator configured to apply a tension to the conveyor belt.

17. The conveyor system of any one or more solutions disclosed herein, in which the control system is further configured to cause the actuator to adjust the tension to the conveyor belt.

18. The conveyor system of any one or more solutions disclosed herein, further including a set of second rollers, wherein each of the set of second has a substantially uniform diameter along a length direction of the second roller.

19. The conveyor system of any one or more solutions disclosed herein, in which the set of second rollers are arranged along a conveyer direction.

20. The conveyor system of any one or more solutions disclosed herein, in which for at least a pair of second rollers of the set, at least one roller of the plurality of rollers is positioned between the pair of second rollers.

21. The conveyor system of any one or more solutions disclosed herein, in which the plurality of rollers and the set of second rollers are arranged in alternating order.

22. The conveyor system of any one or more solutions disclosed herein, in which the plurality of rollers and the set of second rollers are arranged in periodic sections each of which include at least one roller of the plurality of rollers and at least one second roller of the set.

23. The conveyor system of any one or more solutions disclosed herein, further including a loading area where items to be conveyed are received on the conveyor belt and a discharge area where the items are removed from the conveyor belt.

24. The conveyor system of any one or more solutions disclosed herein, in which the plurality of rollers are arranged in a first portion of the frame that encompasses the loading area.

25. The conveyor system of any one or more solutions disclosed herein, in which a set of second rollers are arranged in a second portion of the frame encompassing the discharge area, and each of the set of second rollers has a substantially uniform diameter along a length direction of the second roller.

26. A conveyor system, including: a conveyor belt; a frame; a plurality of rollers supported by the frame and configured to support the conveyor belt, in which the plurality of rollers are configured to create a cushioning zone underneath a central region of the conveyor belt, in which when an item is located on the central region, the central region is configured to move downwardly to decrease the cushioning zone so as to cushion the item while the conveyor belt maintains contact with at least a portion of the plurality of rollers; a drive system configured to move the conveyor belt; and a control system configured to control the drive system.

27. A method, including: placing an item onto a conveyor belt of a conveyor system, in which: the conveyor belt is supported by a plurality of rollers of the conveyor system, and the conveyor system includes a cushioning zone between the conveyor belt and the plurality of rollers formed by a varying dimension of each of the plurality of rollers along a length direction of the roller; and allowing the conveyor belt to deflect into the cushioning zone to dissipate at least a portion of energy transferred to the conveyor belt by placing the item onto the conveyor belt.

28. The method of any one or more solutions disclosed herein, further including: conveying the item on the conveyor belt along a conveyance direction, wherein the plurality of the rollers are arranged substantially parallel to each other along the conveyance direction.

29. The method of any one or more solutions disclosed herein, in which each of the plurality of rollers has two end portions and a middle portion that has a smaller diameter than the two end portions.

30. The method of any one or more solutions disclosed herein, further including: adjusting a tension force applied to the conveyor belt based on a weight of the item.

31. The method of any one or more solutions disclosed herein, in which, further including: allowing the conveyor belt to restore from the deflection after the item is removed from the conveyor belt.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present technology have been shown and described, it will be obvious to those skilled in the art that, based upon the teachings herein, changes and modifications may be made without departing from this technology and its broader aspects and, therefore, the appended claims are to encompass within their scope all such changes and modifications as are within the true spirit and scope of this technology. Furthermore, it is to be understood that the technology is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to technologies containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For example, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and the alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A conveyor system, comprising:
   a conveyor belt;
   a frame;
   a plurality of rollers supported by the frame and configured to support the conveyor belt,
      wherein each of the plurality of rollers has two end portions and a middle portion between the two end portions along a length direction of the roller, the roller is supported by the frame at the two end portions, and the middle portion has a smaller diameter than the two end portions, and
      wherein the plurality of rollers comprises at least one stepped diameter roller that has a recess in the middle portion of the roller relative to the end portions of the roller, and the at least one stepped diameter roller has a cushion positioned in the recess, the cushion being more flexible than the middle portion and the end portions of the roller such that the cushion deforms to a larger extent than the middle portion or the end portions of the roller when an item is placed on the conveyor belt at a position directly above the roller;
   a drive system configured to move the conveyor belt; and
   a control system configured to control the drive system.

2. The conveyor system of claim 1, wherein each respective middle portion is spaced apart from a central region of the conveyor belt to define a cushioning zone between the respective middle portion and the central region, wherein when an item is located on the central region, the central region is configured to move downwardly toward the respective middle portion to decrease the cushioning zone so as to cushion the item while the conveyor belt maintains contact with the two end portions adjacent the respective middle portion.

3. The conveyor system of claim 1, wherein for at least one of the plurality of rollers, the middle portion has a diameter that decreases gradually from an adjacent one of the end portions.

4. The conveyor system of claim 1, wherein the plurality of rollers comprises multiple stepped diameter rollers each of which has a recess in the middle portion of the roller relative to the end portions of the roller.

5. The conveyor system of claim 1, wherein: for each of the plurality of rollers,
   the conveyor belt is spaced, along a direction substantially perpendicular to the length direction of the roller, from a middle portion of the roller by a first distance and from an end portion of the roller by a second distance, and
   when the conveyor belt is unloaded, the first distance is larger than the second distance.

6. The conveyor system of claim 1, wherein when the conveyor belt is unloaded, there is a cushioning zone between the conveyor belt and the middle portion of each of the plurality of rollers to allow the conveyor belt to deflect into.

7. The conveyor system of claim 6, wherein when an item is placed on the conveyor belt, at least a portion of the conveyor belt deflects toward one or more of the plurality of rollers that are positioned to support the at least a portion of the conveyor belt such that the cushioning zone corresponding to the one or more rollers decreases.

8. The conveyor system of claim 1, wherein the conveyor belt is configured to deflect such that at least a portion of energy transferred to the conveyor belt by placing an item on the conveyor belt dissipates by the deflection of the conveyor belt.

9. The conveyor system of claim 1, wherein the conveyor belt comprises a flexible material.

10. The conveyor system of claim 1, wherein the conveyor belt comprises rubber, polyvinyl chloride (PVC), polyurethane, nylon, polyester, silicone, or fiberglass.

11. The conveyor system of claim 1, wherein the plurality of rollers are arranged substantially parallel to each other and spaced apart along a conveyance direction to define a cushioning zone extending along the conveyance direction and above the middle portions.

12. The conveyor system of claim 11, wherein for each of the plurality of rollers, the length direction of the roller is substantially perpendicular to the conveyer direction.

13. The conveyor system of claim 1, wherein the drive system comprises an actuator configured to apply a tension to the conveyor belt.

14. The conveyor system of claim 13, wherein the control system is further configured to cause the actuator to adjust the tension to the conveyor belt.

15. The conveyor system of claim 1, further comprising a set of second rollers, wherein each of the set of second has a substantially uniform diameter along a length direction of the second roller.

16. The conveyor system of claim 15, wherein the plurality of rollers and the set of second rollers are arranged in periodic sections each of which include at least one roller of the plurality of rollers and at least one second roller of the set.

17. The conveyor system of claim 1, further comprising a loading area where items to be conveyed are received on the conveyor belt and a discharge area where the items are removed from the conveyor belt, wherein the plurality of rollers are arranged in a first portion of the frame that encompasses the loading area,
a set of second rollers are arranged in a second portion of the frame that encompasses the discharge area, and
each of the set of second rollers has a substantially uniform diameter along a length direction of the second roller.

18. A method, comprising:
placing an item onto a conveyor belt of a conveyor system, wherein:
the conveyor belt is supported by a plurality of rollers of the conveyor system, and
the conveyor system includes a cushioning zone between the conveyor belt and the plurality of rollers formed by a varying dimension of each of the plurality of rollers along a length direction of the roller; and
the plurality of rollers comprises at least one stepped diameter roller that has a recess in a middle portion of the roller relative to end portions of the roller, and the at least one stepped diameter roller has a cushion positioned in the recess, the cushion being more flexible than the middle portion and the end portions of the roller such that the cushion deforms to a larger extent than the middle portion or the end portions of the roller when an item is placed on the conveyor belt at a position directly above the roller; and
allowing the conveyor belt to deflect into the cushioning zone to dissipate at least a portion of energy transferred to the conveyor belt by placing the item onto the conveyor belt.

19. The method of claim 18, further comprising:
adjusting a tension force applied to the conveyor belt based on a weight of the item.

* * * * *